(12) United States Patent
Shimura et al.

(10) Patent No.: US 7,690,568 B2
(45) Date of Patent: Apr. 6, 2010

(54) TAG READING APPARATUS

(75) Inventors: Takahiro Shimura, Mishima (JP); Yasuo Matsumoto, Numazu (JP); Kouichi Sano, Ihara (JP); Yasuhito Kiji, Mishima (JP); Nobuo Murofushi, Susono (JP)

(73) Assignee: Toshiba Tec Kabushiki Kaisha (JP)

( * ) Notice: Subject to any disclaimer, the term of this patent is extended or adjusted under 35 U.S.C. 154(b) by 41 days.

(21) Appl. No.: 11/591,417

(22) Filed: Oct. 26, 2006

(65) Prior Publication Data

US 2007/0095911 A1 May 3, 2007

(30) Foreign Application Priority Data

Oct. 31, 2005 (JP) ............................. 2005-317610

(51) Int. Cl.
*G06K 7/00* (2006.01)
(52) U.S. Cl. ....................................... 235/440; 235/383
(58) Field of Classification Search ................. 235/440, 235/462.01, 462.13, 383
See application file for complete search history.

(56) References Cited

U.S. PATENT DOCUMENTS

| | | | | |
|---|---|---|---|---|
| 6,195,053 | B1 * | 2/2001 | Kodukula et al. | 343/702 |
| 6,415,978 | B1 * | 7/2002 | McAllister | 235/462.01 |
| 2005/0199723 | A1 * | 9/2005 | Lubow | 235/462.01 |

FOREIGN PATENT DOCUMENTS

| | | |
|---|---|---|
| JP | 03-036199 | 2/1991 |
| JP | 11-144012 | 5/1999 |
| JP | 2000-103505 | 4/2000 |
| JP | 2001-180812 | 7/2001 |
| JP | 2002-240913 | 8/2002 |
| JP | 2004-210428 | 7/2004 |
| JP | 2005-011083 | 1/2005 |
| JP | 2005-225674 | 8/2005 |
| JP | 2005-280963 | 10/2005 |

OTHER PUBLICATIONS

Communication (with translation) mailed Jul. 15, 2008 from Japanese Patent Office re related application.

* cited by examiner

*Primary Examiner*—Michael G Lee
*Assistant Examiner*—Rafferty Kelly
(74) *Attorney, Agent, or Firm*—Harness, Dickey & Pierce, P.L.C.

(57) ABSTRACT

There are provided a barcode reader for reading an article code in a barcode form from an article tag, and an RFID tag reader for reading a shelf code from a shelf tag in a non-contact wireless manner. The article code read by the barcode reader is stored in an article code memory, and the shelf code read by the RFID tag reader is stored in a shelf code memory. There are also provided an information processing unit, a control unit and a transmission unit. The information processing unit is controlled by the control unit to process the article code and the shelf code as one set of information for article management. Then, the transmission unit transmits the processed information to a personal computer.

4 Claims, 14 Drawing Sheets

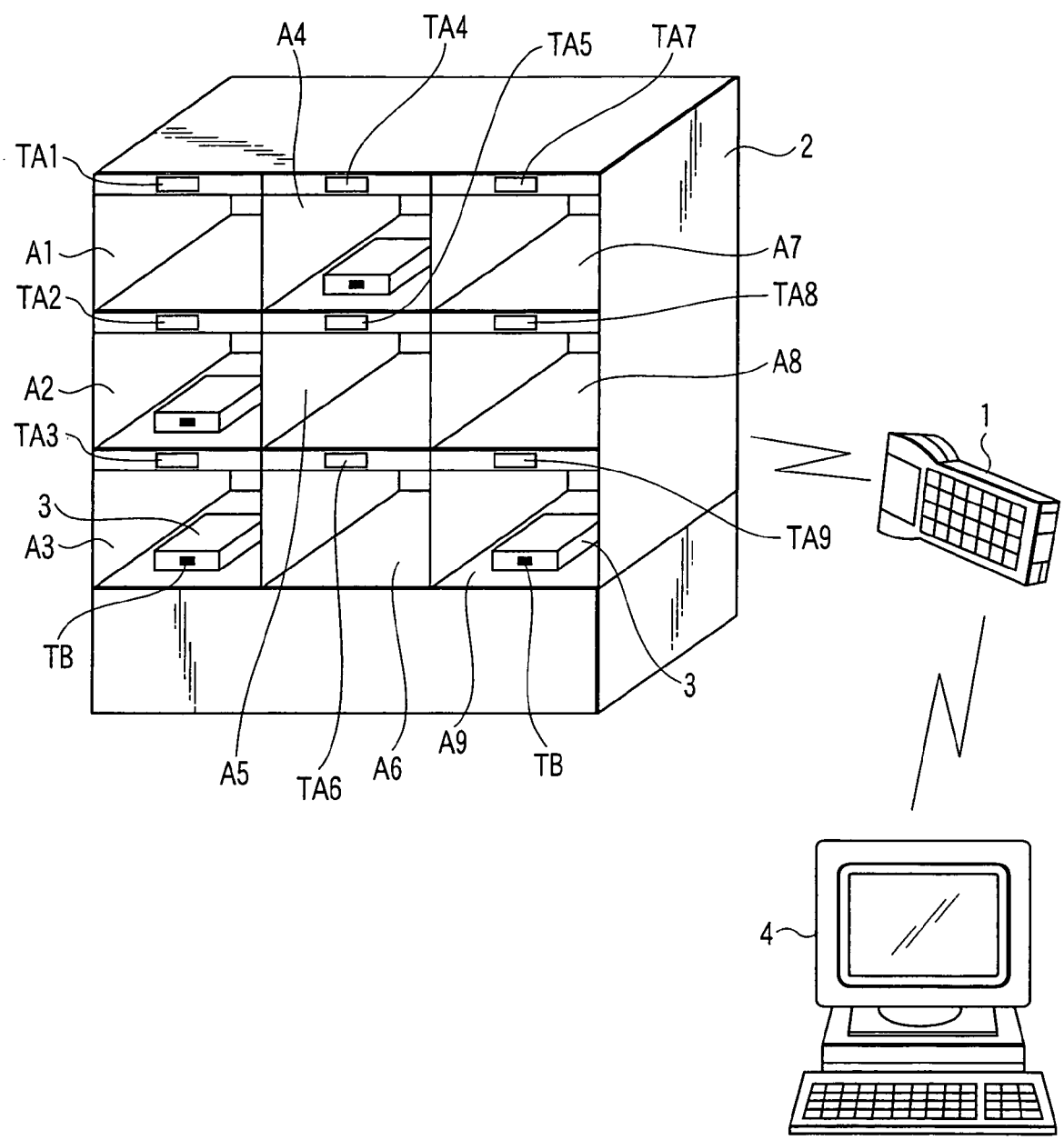
F I G. 1

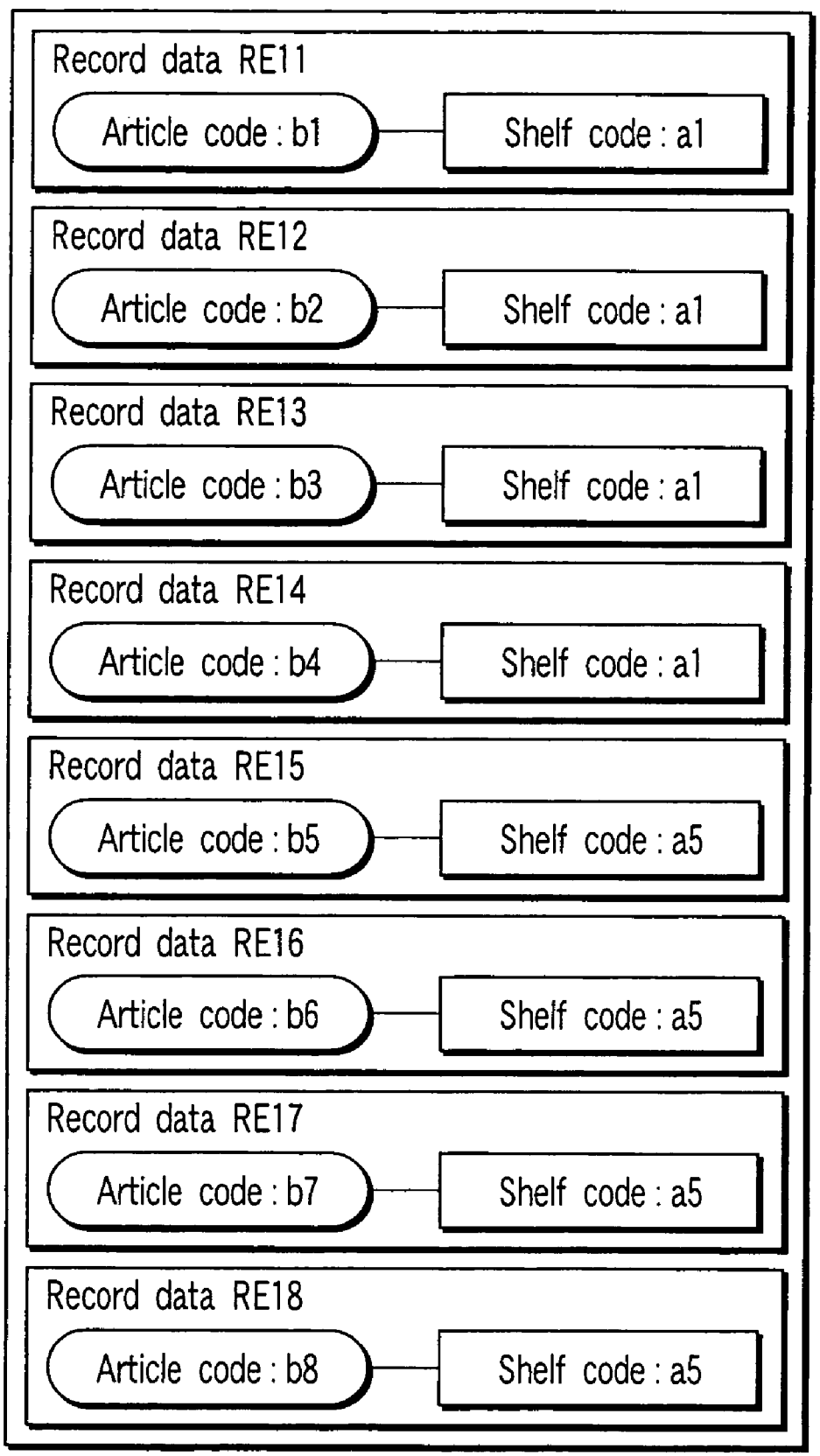
F I G. 10

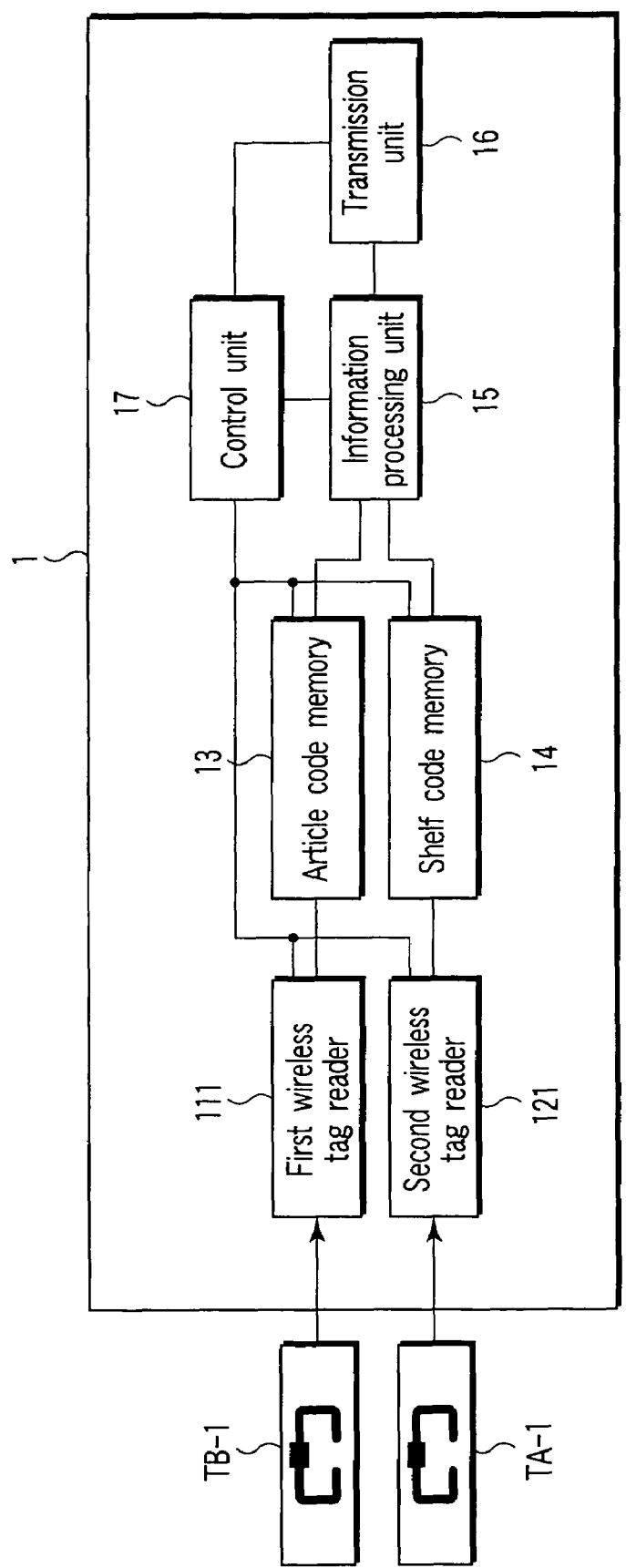
F I G. 13

TAG READING APPARATUS

CROSS-REFERENCE TO RELATED APPLICATIONS

This application is based upon and claims the benefit of priority from prior Japanese Patent Application No. 2005-317610, filed Oct. 31, 2005, the entire contents of which are incorporated herein by reference.

BACKGROUND OF THE INVENTION

1. Field of the Invention

The present invention relates to a tag reading apparatus used for, e.g., managing the positions of articles.

2. Description of the Related Art

In retail outlets such as department stores, supermarkets and convenience stores, display racks for products are installed on sales floors. Then, items of merchandise are displayed on the product display shelves and sold to customers.

In the stores, for example, tags are used when a large amount of merchandise is managed. That is, a tag is attached to each item of merchandise, and tags are also attached to the display shelves for merchandise, so that data printed or electronically recorded on the tags is used to manage which item of merchandise is located on which display shelf.

For example, a technique is disclosed in Jpn. Pat. Appln. KOKAI Publication No. 2001-180812, wherein wireless tags are attached to display shelves and articles displayed on these shelves to manage them. That is, the tags in which shelf numbers given to the product display shelves are recorded in IC chips in the form of electronic data are attached to the corresponding display shelves. Further, the tags in which identification numbers enabling the identification of the articles are recorded in IC chips in the form of electronic data are attached to the individual articles.

Then, a handheld reader/writer apparatus is brought into proximity with the tag attached to the display shelf to read the shelf number from the tag. Further, this reader/writer apparatus is brought into proximity with the tag attached to the article to record the read shelf number into the tag.

Thus, the identification number of the article and the shelf number are recorded on the tag attached to the article, thereby managing which article is displayed on which shelf.

However, when the identification number of the article and the shelf number are recorded on the tag of the article, the tags of the individual articles have to be read in order to know the correspondence between the articles and the display shelves. Therefore, when there is a plurality of display shelves and a large number of articles are displayed on the individual display shelves, the task of knowing the correspondence between the articles and the display shelves is complicated and troublesome.

BRIEF SUMMARY OF THE INVENTION

The present invention comprises a first reader reading article information regarding an article, a second reader reading position information regarding a position, and a controller which associates the article information read by the first reader with the position information read by the second reader to process article information and position information as a set of information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a system configuration diagram according to a first embodiment of the present invention;

FIG. 10 is a diagram showing a record data example in which a set is made of an article code and a shelf code created by the tag reading apparatus in the third embodiment;

FIG. 13 is a block diagram of a tag reading apparatus according to a fourth embodiment of the present invention;

DETAILED DESCRIPTION OF THE INVENTION

First Embodiment

In FIG. 1, 1 denotes a handheld tag reading apparatus, 2 denotes a merchandise display shelf for displaying a plurality of articles 3, 4 denotes a personal computer for managing information.

The merchandise display shelf 2 is divided into a plurality of shelf areas A1, A2, A3, A4, A5, A6, A7, A8 and A9. Shelf tags TA which are position tags, that is, shelf tags TA1, TA2, TA3, TA4, TA5, TA6, TA7, TA8 and TA9 are attached to front frames of shelf areas A1 to A9.

Shelf tags TA1 to TA9 comprise RFID tags, in which information associated with positions, that is, shelf codes indicating the positions of the shelf areas, is recorded in internal memories.

The articles 3 are displayed in shelf areas A1 to A9 of the display shelf 2. Article tags TB are attached to the plurality of articles 3 displayed on the display shelf 2. The article tags TB record article codes which are information associated with the articles, for example, in the form of a barcode. It should be noted that the article codes may be recorded in the form of two-dimensional codes.

Figure 2:
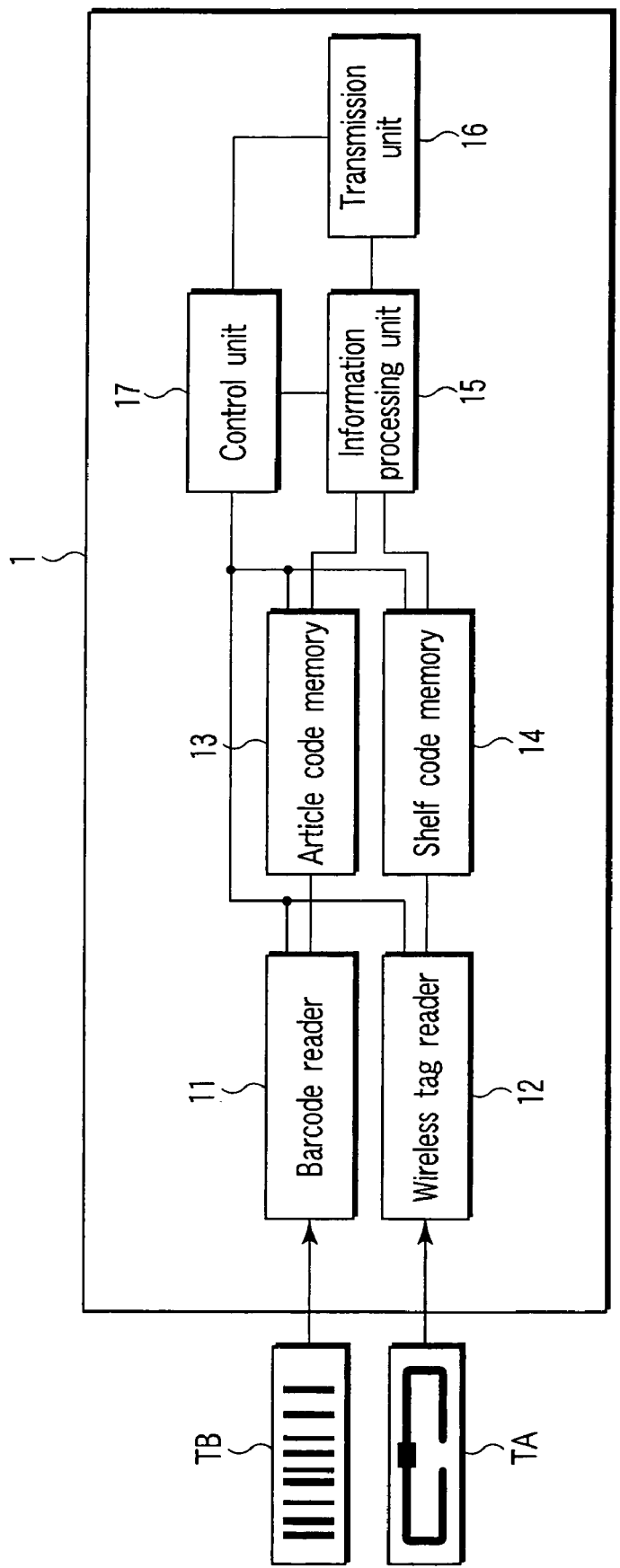
FIG. 2 is a block diagram of a tag reading apparatus in the first embodiment.

As shown in FIG. 2, the tag reading apparatus 1 is provided with a barcode reader 11 as a first reader for reading the article codes from the article tags TB, and an RFID tag reader 12 as a second reader for reading the shelf codes from the shelf tags TA in a non-contact wireless manner. The barcode reader 11 is an optical reader for optically reading the article codes in the barcode form.

The tag reading apparatus 1 stores the article codes read by the barcode reader 11 in an article code memory 13, and stores the shelf codes read by the RFID tag reader 12 in a shelf code memory 14.

The tag reading apparatus 1 is further provided with an information processing unit 15, a transmission unit 16 and a control unit 17. The information processing unit 15 associates the article code stored in the article code memory 13 with the shelf code stored in the shelf code memory 14 to process these codes as one set of information for article management, and outputs this processed one set of information to the transmission unit 16. The transmission unit 16 wirelessly transmits the input one set of information to the personal computer 4.

The control unit 17 controls the barcode reader 11, the RFID tag reader 12, the article code memory 13, the shelf code memory 14, the information processing unit 15, and the transmission unit 16. The information processing unit 15 and the control unit 17 are implemented with microprocessors.

Figure 3:
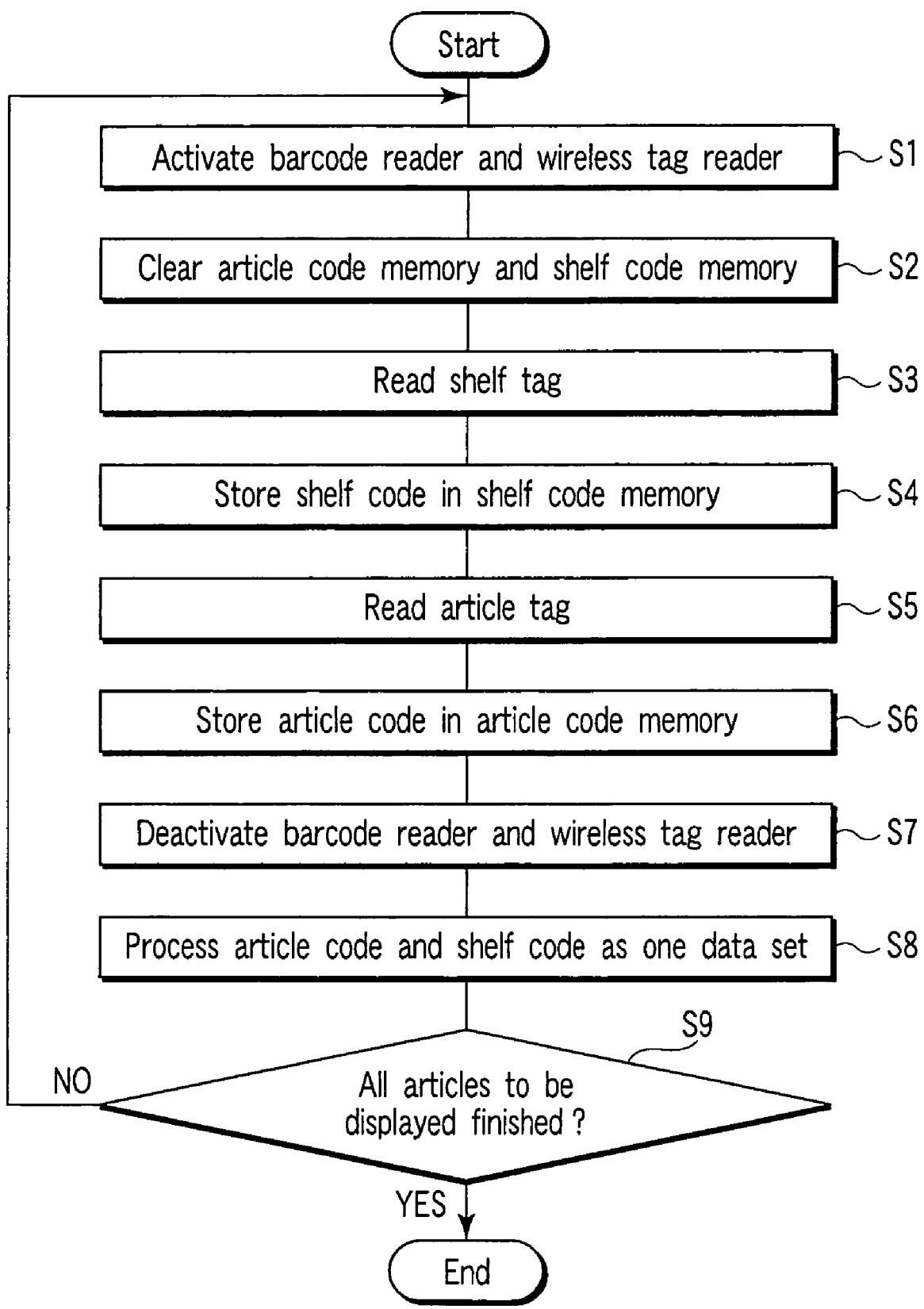
FIG. 3 is a flowchart showing tag reading control performed by a control unit of the tag reading apparatus in the first embodiment.

The control unit 17 of the tag reading apparatus 1 performs tag reading processing compliant with a flowchart shown in FIG. 3.

That is, in step S1, the tag reading apparatus 1 activates the barcode reader 11 and the RFID tag reader 12. For example, they are activated by the operation of a start switch (not shown) provided in the tag reading apparatus 1. Then, in step S2, the article code memory 13 and the shelf code memory 14 are cleared.

Figure 4A:
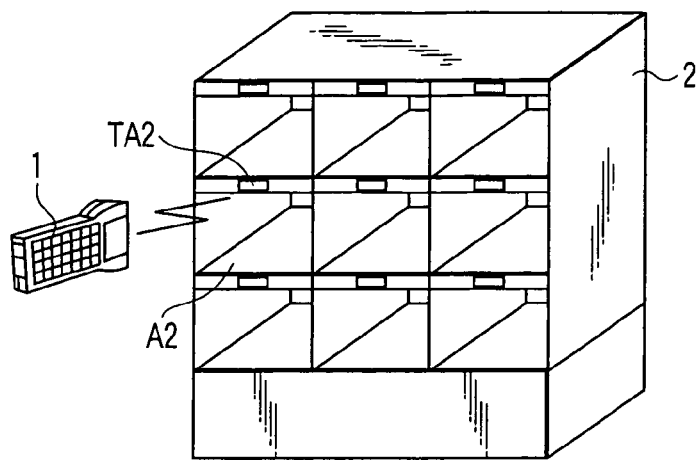
FIG. 4A is a diagram showing how the tag reading apparatus reads a shelf tag of a display shelf in the first embodiment.

A case will be described where, for example, an article B1 which is one of the articles 3 is displayed in shelf area A2. As shown in FIG. 4A, the tag reading apparatus 1 is placed in proximity to the shelf tag TA2 of shelf area A2. Then, in step S3, the tag reading apparatus 1 reads a shelf code a2 from the shelf tag TA2 by the RFID tag reader 12. In step S4, the tag reading apparatus 1 stores the read shelf code a2 in the shelf code memory 14.

Figure 4B:
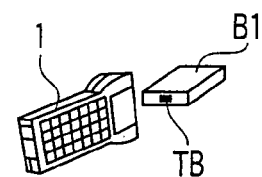
FIG. 4B. is a diagram showing how the tag reading apparatus reads an article tag of an article in the first embodiment.

Subsequently, in step S5, the tag reading apparatus 1 reads an article code b1 from the article tag TB of the article B1. As shown in FIG. 4B, this reading is achieved by bringing the barcode reader 11 of the tag reading apparatus 1 into contact with the article tag TB of the article B1 to scan a barcode thereon. Then, in step S6, the tag reading apparatus 1 stores the article code b1 read by the barcode reader 11 in the article code memory 13.

Upon termination of the storage of the shelf code a2 read from the shelf tag TA2 into the shelf code memory 14 and the storage of the article code b1 read from the article tag TB into the article code memory 13, the tag reading apparatus 1, in step S7, deactivates the barcode reader 11 and the RFID tag reader 12. It is to be noted that the termination of the storage of the shelf code a2 and the article code b1 in the memories may be notified by a lamp or a buzzer.

Figure 4C:
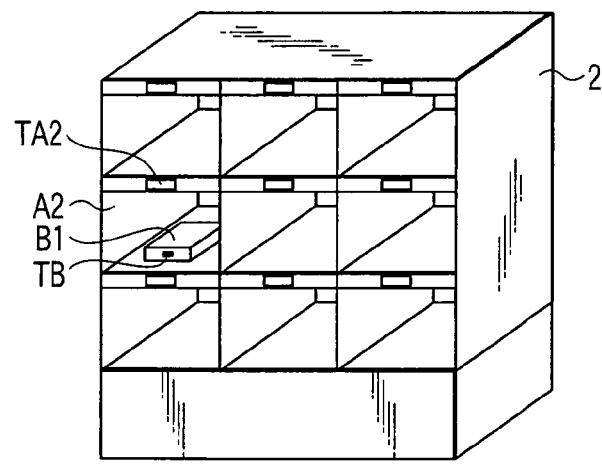
FIG. 4C is a diagram showing how the article is displayed in a corresponding shelf area of the display shelf in the first embodiment.

Subsequently, in step S8, in the tag reading apparatus 1, the information processing unit 15 is controlled by the control unit 17 to create one set of data out of the article code and the shelf code. When the task of reading the shelf code a2 and the article code b1 by the tag reading apparatus 1 is finished, the article B1 is disposed and displayed in shelf area A2 by an operator, as shown in FIG. 4C.

Figure 4D:
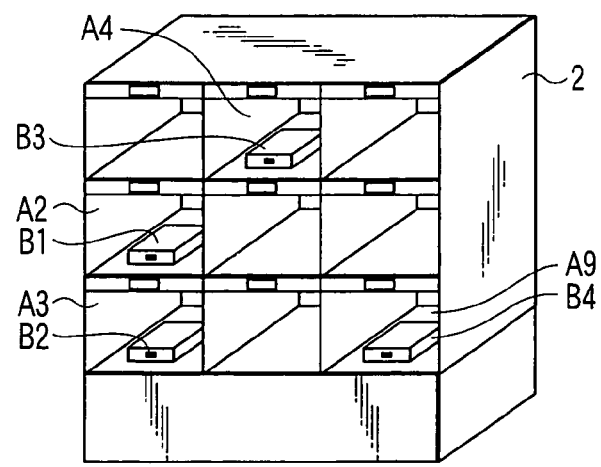
FIG. 4D is a diagram showing how all the articles are displayed in the corresponding shelf areas of the display shelf in the first embodiment.

Thus, the tag reading apparatus 1 repeats the tasks from step S1 to step S8. The plurality of articles 3 are displayed on the product display shelf 2 by the tag reading apparatus 1 and the operator. That is, as shown in FIG. 4D, an article B2 is displayed in shelf area A3, an article B3 is displayed in shelf area A4, and an article B4 is displayed in shelf area A9.

When the plurality of articles 3 have been placed on display on the product display shelf 2, an end switch (not shown) provided in the tag reading apparatus 1 is operated by the operator. Thus, in step S9, the control unit 17 judges that the reading operation is finished for all the articles to be displayed, and terminates this tag reading processing.

Figure 5:
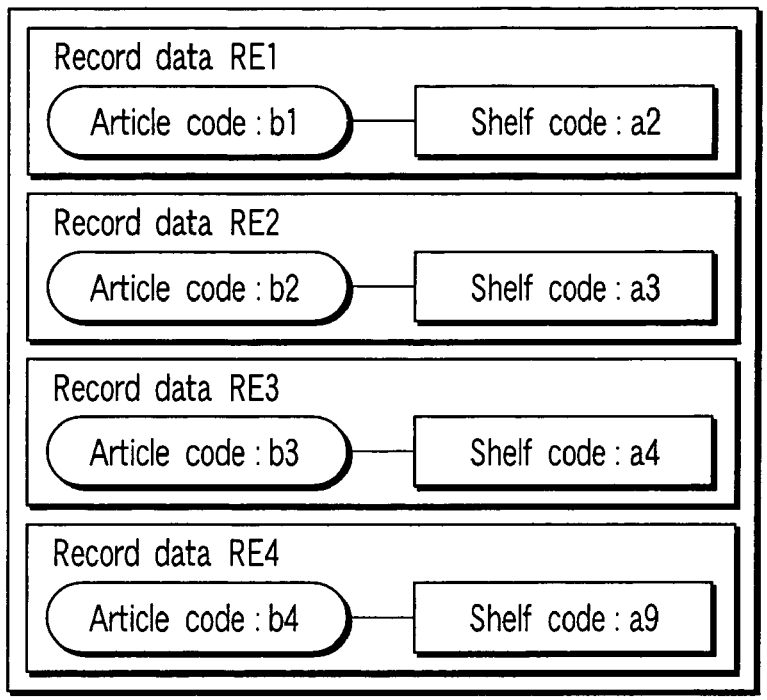
FIG. 5 is a diagram showing a record data example in which a set is made up of an article code and a shelf code created by the tag reading apparatus in the first embodiment.

By this tag reading processing, the information processing unit 15 combines the article code b1 of the article tag TB of the article B1 with the shelf code a2 of the shelf tag TA2 to create one set of record data RE1, and combines an article code b2 of the article tag TB of the article B2 with a shelf code a3 of the shelf tag TA3 to create one set of record data RE2, as shown in FIG. 5. Moreover, the information processing unit 15 combines an article code b3 of the article tag TB of the article B3 with a shelf code a4 of the shelf tag TA4 to create one set of record data RE3, and combines an article code b4 of the article tag TB of the article B4 with a shelf code a9 the shelf tag TA9 to create one set of record data RE4.

Furthermore, the tag reading apparatus 1 passes the record data RE1 to RE4 from the information processing unit 15 to the transmission unit 16, and transmits them from the transmission unit 16 to the external personal computer 4. On receipt of the record data RE1 to RE4, the personal computer 4 stores the record data RE1 to RE4 in a database and manages them.

Thus, the tag reading apparatus 1 reads and combines the article code recorded on the article tag TB and the shelf code recorded on the shelf tag TA to create one set of record data, such that the personal computer 4 can integrally manage shelf areas A1 to A9 of the product display shelf 2 and the articles 3 (B1 to B4) to be displayed.

Furthermore, the tag reading apparatus 1 reads the shelf code from the shelf tag TA, deactivates the RFID tag reader 12 and the barcode reader 11 whenever the tag reading apparatus 1 reads the article code from the article tag TB to be displayed, and reactivates the RFID tag reader 12 and the barcode reader 11 when activating next reading. The tag reading apparatus 1 can thus achieve sufficient power saving. Therefore, the present invention is effective in the handheld small tag reading apparatus 1.

Figure 6:
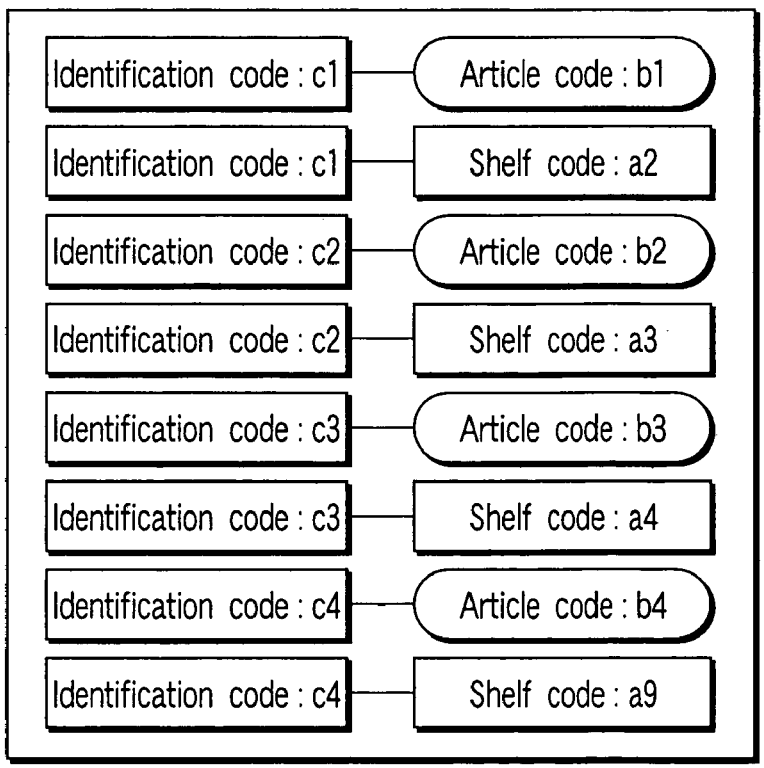
FIG. 6 is a diagram showing a record data example in which identification codes are used to make sets of the article and shelf codes created by the tag reading apparatus in the first embodiment.

It is to be noted that the article code and the shelf code are managed so that they are directly matched one to one in this embodiment, but this is not a limitation. For example, as shown in FIG. 6, a common identification code may be used, and the article code and the shelf code may be managed so that they are matched via this common identification code. That is, a common identification code c1 is used to match the article code b1 to the shelf code a2, a common identification code c2 is used to match the article code b2 to the shelf code a3, a common identification code c3 is used to match the article code b3 to the shelf code a4, and a common identification code c4 is used to match the article code b4 to the shelf code a9.

Second Embodiment

A second embodiment is different from the first embodiment described above in how a control unit 17 controls the activating and deactivating of a barcode reader 11 and an RFID tag reader 12, but the second embodiment is the same as the first embodiment described above in a hardware configuration of a tag reading apparatus 1.

Figure 7:
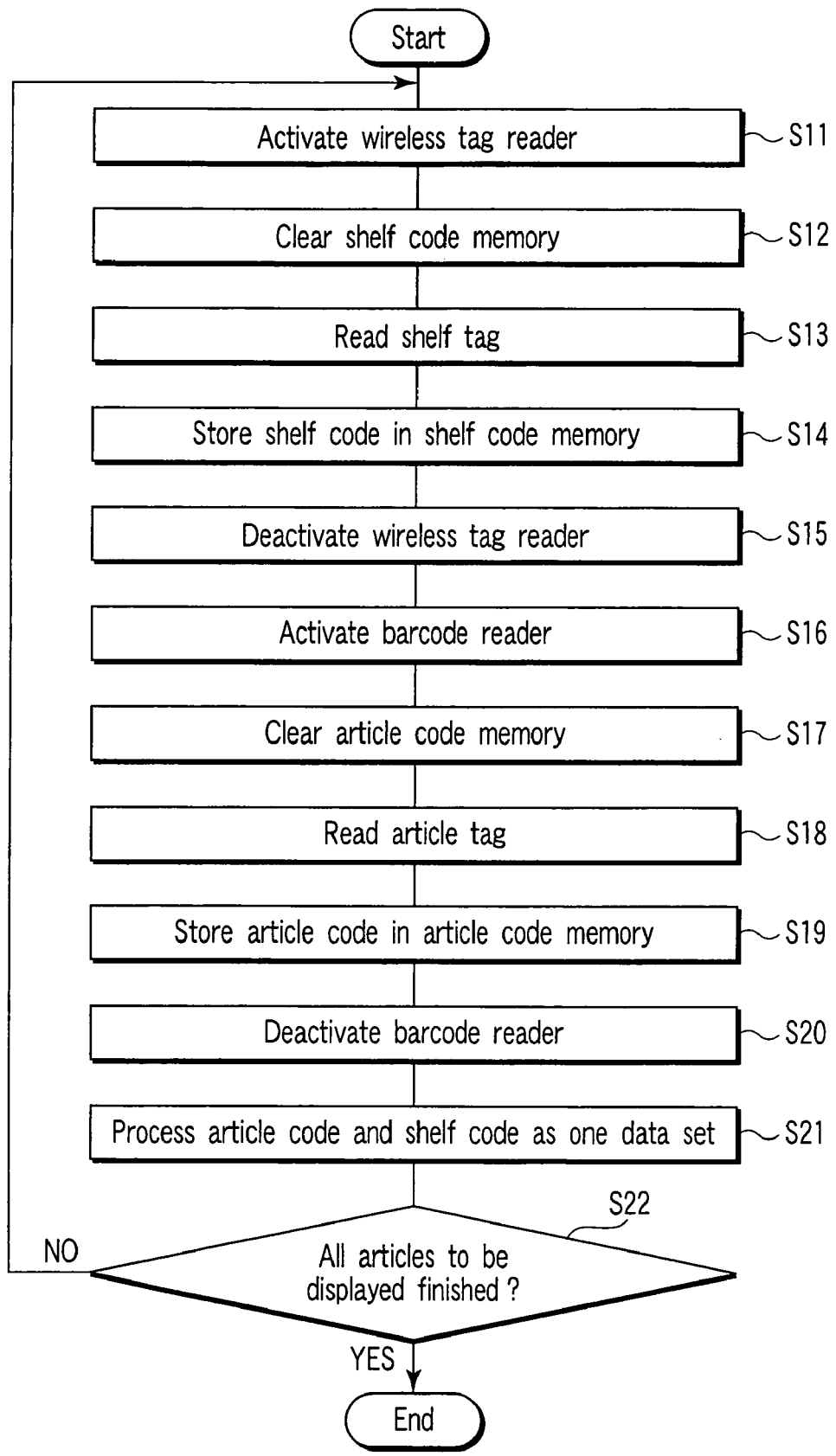
FIG. 7 is a flowchart showing tag reading control performed by a control unit of a tag reading apparatus according to a second embodiment of the present invention.

In this embodiment, the control unit 17 of the tag reading apparatus 1 performs tag reading processing compliant with a flowchart shown in FIG. 7.

In step S11, the tag reading apparatus 1 activates the RFID tag reader 12. For example, the RFID tag reader 12 is activated by the operation of a first start switch (not shown) provided in the tag reading apparatus 1. Then, in step S12, the tag reading apparatus 1 clears a shelf code memory 14.

Subsequently, in step S13, the tag reading apparatus 1 reads a shelf code by the RFID tag reader 12. In step S14, the tag reading apparatus 1 stores the read shelf code in the shelf code memory 14. Upon termination of the storage of the shelf code in the shelf code memory 14, the tag reading apparatus 1, in step S15, deactivates the RFID tag reader 12.

Next, in step S16, the tag reading apparatus 1 activates the barcode reader 11. For example, the barcode reader 11 is activated by the operation of a second start switch (not shown) provided in the tag reading apparatus 1. Then, in step S17, the tag reading apparatus 1 clears an article code memory 13.

Then, in step S18, the tag reading apparatus 1 scans a barcode with the barcode reader 11 to read an article code. In step S19, the tag reading apparatus 1 stores the read article code in the article code memory 13. In step S20, the tag reading apparatus 1 deactivates the barcode reader 11.

Subsequently, in step S21, in the tag reading apparatus 1, an information processing unit 15 is controlled by the control unit 17 to create one set of data out of the article code and the shelf code. When the task of reading the shelf code and the article code by the tag reading apparatus 1 is finished, an article is disposed and displayed in a shelf area by an operator. Moreover, if there still remain articles to be displayed, the tasks from step S11 to step S21 are repeated in accordance with an instruction based on the re-operation of the first start switch by the operator.

When a plurality of articles 3 have been placed on display on a product display shelf 2, an end switch (not shown) provided in the tag reading apparatus 1 is operated by the operator. In step S22, the control unit 17 judges that the reading operation is finished for all the articles to be displayed, and terminates this tag reading processing.

This tag reading apparatus 1 deactivates the barcode reader 11 when the RFID tag reader 12 is in operation, and deactivates the RFID tag reader 12 when the barcode reader 11 is in operation.

Therefore, the article code is not erroneously read from an article tag during the reading of a shelf tag, or the shelf code is not erroneously read from the shelf tag during the reading of the article tag.

It is to be noted that functions and effects similar to those in the first embodiment described above can be obtained in other respects.

In the first and second embodiments described above, the article code is recorded in the article tag in a barcode form, the shelf code is recorded in the shelf tag comprising an RFID tag, the article code is read from the article tag by the barcode reader, and the shelf code is read from the shelf tag by the RFID tag reader.

However, the relation between the article tag and the shelf tag may be converse. That is, an RFID tag recording the article tag may be used as the article tag, and a tag recording the shelf code in the barcode form may be used as the shelf tag, so that the article code is read from the article tag by the RFID tag reader, and the shelf code is read from the shelf tag by the barcode reader.

Furthermore, the article code is read from the article tag after the shelf code is read from the shelf tag in the first and second embodiments described above, but the order of reading may be reverse. That is, the shelf code may be read from the shelf tag after the article code is read from the article tag.

Third Embodiment

In a third embodiment, a case will be described where a plurality of articles are displayed in a shelf area of a product display shelf 2. It is to be noted that the third embodiment is different from the first embodiment described above in the processing of a control unit 17, but the same as the first embodiment described above in a hardware configuration of a tag reading apparatus 1.

Figure 8:
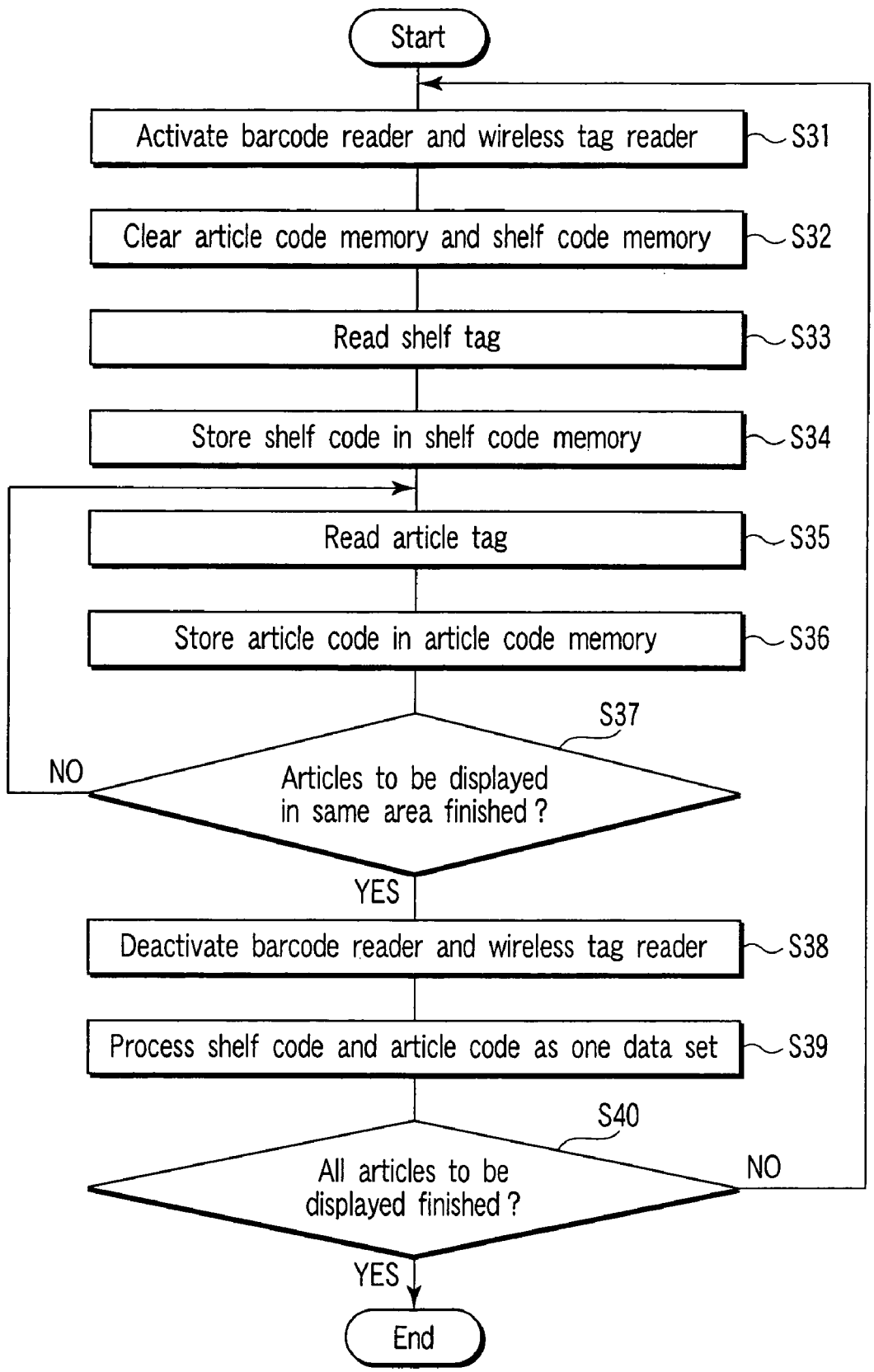
FIG. 8 is a flowchart showing tag reading control performed by a control unit of a tag reading apparatus according to a third embodiment of the present invention.

In this embodiment, the control unit 17 of the tag reading apparatus 1 performs tag reading processing compliant with a flowchart shown in FIG. 8.

In step S31, a barcode reader 11 and an RFID tag reader 12 are activated. For example, they are activated by the operation of a start switch (not shown) provided in the tag reading apparatus 1. Then, in step S32, an article code memory 13 and a shelf code memory 14 are cleared.

Figure 9A:
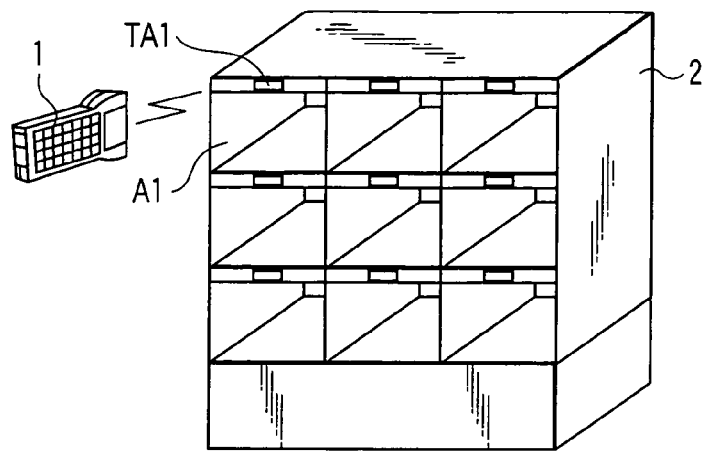
FIG. 9A is a diagram showing how the tag reading apparatus reads a shelf tag of a display shelf in the third embodiment.

A case will be described where, for example, four articles B1, B2, B3 and B4 are displayed in a shelf area A1, and four articles B5, B6, B7 and B8 are displayed in a shelf area A5. First, as shown in FIG. 9A, the tag reading apparatus 1 is placed in proximity to a shelf tag TA1 of shelf area A1. In step S33, the tag reading apparatus 1 reads a shelf code a1 from the shelf tag TA1 by the RFID tag reader 12. In step S34, the tag reading apparatus 1 stores the read shelf code a1 in the shelf code memory 14.

Figure 9B:
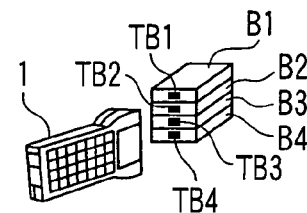
FIG. 9B is a diagram showing how the tag reading apparatus reads article tags of articles in the third embodiment.

In step S35 and S36, the tag reading apparatus 1 reads article codes b1, b2, b3 and b4 from article tags TB1, TB2, TB3 and TB4 of the articles B1, B2, B3 and B4, as shown in FIG. 9B. That is, the article code b2 is read from the article tag TB2 of the article B2 by the barcode reader 11 and then stored in the article code memory 13. Moreover, the article code b3 is read from the article tag TB3 of the article B3 by the barcode reader 11 and then stored in the article code memory 13. Further, the article code b4 is read from the article tag TB4 of the article B4 by the barcode reader 11 and then stored in the article code memory 13.

Subsequently, in step S37, the tag reading apparatus 1 judges that the reading of the article codes from the article tags TB has been finished. When the tag reading apparatus 1 judges in step S37 that the article tags to be read have not been finished, the tag reading apparatus 1 repeats the processing in S35 and S36.

In accordance with the operation of an article end switch (not shown) provided in the tag reading apparatus 1 by the operator, the tag reading apparatus 1 judges in step S37 that the reading of the article codes from the article tags TB has been finished. In step S38, the tag reading apparatus 1 deactivates the barcode reader 11 and the RFID tag reader 12. It is to be noted that the termination of the reading may be notified by a lamp or a buzzer.

Figure 9C:
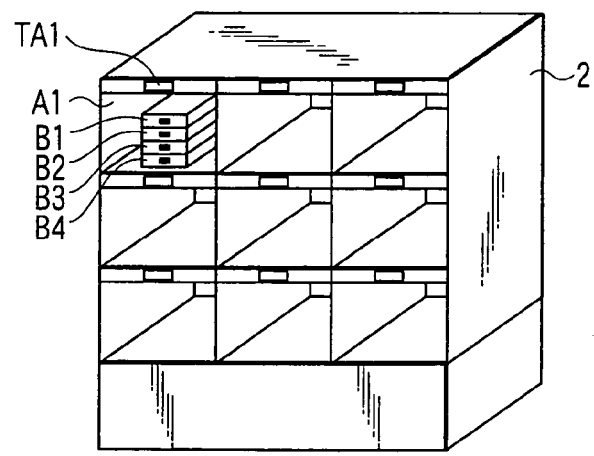
FIG. 9C is a diagram showing how a plurality of articles are displayed in a corresponding shelf area of the display shelf in the third embodiment.

In step S39, in the tag reading apparatus 1, an information processing unit 15 is controlled by the control unit 17 to create one set of data out of the four article codes b1, b2, b3 and b4 and a shelf code a1. When the task of reading the shelf code a1 and the article codes b1, b2, b3 and b4 by the tag reading apparatus 1 is finished, the articles B1, B2, B3 and B4 are displayed in shelf area A1 by the operator, as shown in FIG. 9C.

When there still remain articles B5, B6, B7 and B8 to be displayed in shelf area A5, the tag reading apparatus 1 repeats the processing from step S31 to step S39 in accordance with the re-operation of the start switch by the operator.

Figure 9D:
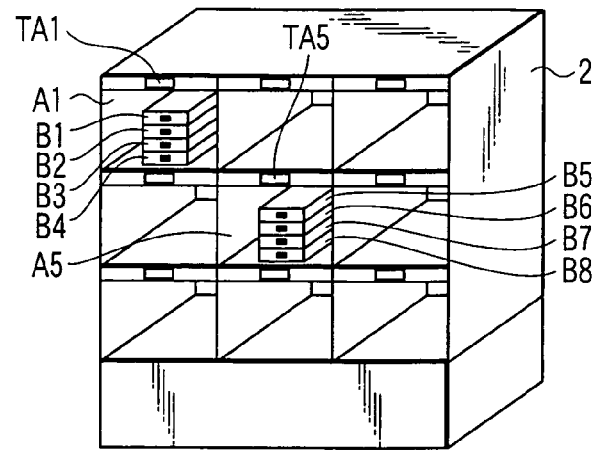
FIG. 9D is a diagram showing how all the articles are displayed in the corresponding shelf areas of the display shelf in the third embodiment.

By this repeated processing, the articles B5, B6, B7 and B8 are displayed in shelf area A5, as shown in FIG. 9D. When the displaying of the articles is finished, the control unit 17 in step S40 judges, in accordance with the operation of the end switch (not shown) provided in the tag reading apparatus 1 by the operator, that the reading operation is finished for all the articles to be displayed, and terminates this tag reading processing.

By such tag reading processing, the information processing unit 15 combines the article code b1 of the article tag TB1 of the article B1 with the shelf code a1 the shelf tag TA1 to create one set of record data RE11, and combines the article code b2 of the article tag TB2 of the article B2 with the same shelf code a1 to create one set of record data RE12, as shown in FIG. 10. Moreover, record data RE13 to record data RE18 are created to correspond to the article code b3 to the article code b8 of the article B3 to the article B8.

Then, the record data RE11 to RE18 are sequentially transmitted from a transmission unit 16 to a personal computer 4. The personal computer 4 stores the record data RE11 to RE18 in a database and manage them.

Thus, in the case where the plurality of articles are displayed in the individual shelf areas as well, the article code recorded on the article tag and the shelf code recorded on the shelf tag are read and combined to create one set of record data, such that the personal computer 4 can integrally manage shelf areas A1 to A9 of the merchandise display shelf 2 and the articles 3 (B1 to B8) to be displayed.

In addition, the article tags are individually read for the plurality of articles to be displayed in the shelf area, but the shelf tag has only to be read one time, so that the reading operation can be easier, and operating time can be reduced.

Furthermore, the tag reading apparatus 1 reads the shelf code from the shelf tag in the shelf area, and deactivates the RFID tag reader 12 and the barcode reader 11 whenever the tag reading apparatus 1 reads the article code from the article tag of the article to be displayed in that shelf area. Then, the tag reading apparatus 1 reactivates the RFID tag reader 12 and the barcode reader 11 when starting the reading of the shelf code from the shelf tag of the next shelf area. The tag reading apparatus 1 can thus achieve sufficient power saving. Therefore, the present invention is extremely effective in the handheld small tag reading apparatus 1.

Figure 11:
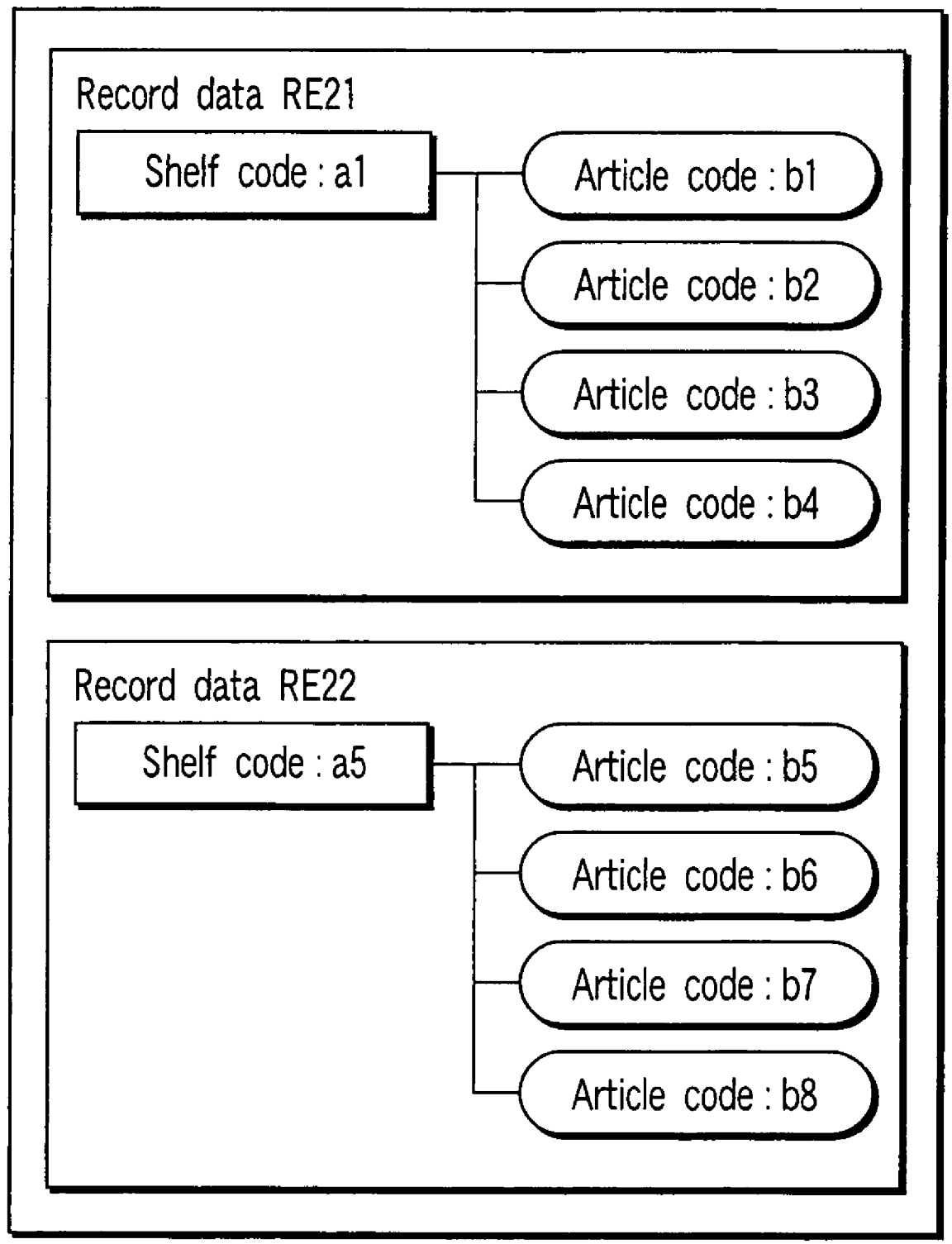
FIG. 11 is a diagram showing a record data example in which a set is made of a shelf code and a plurality of article codes created by the tag reading apparatus in the third embodiment.

It is to be noted that the article code and the shelf code are managed so that they are directly matched one to one in this embodiment, but this is not a limitation. For example, as shown in FIG. 11, one common shelf code a1 and the four article codes b1, b2, b3 and b4 to be displayed may make one set to create record data RE21, and one common shelf code a5 and the four article codes b5, b6, b7 and b8 to be displayed may make one set to create record data RE22, thereby achieving management.

Figure 12:
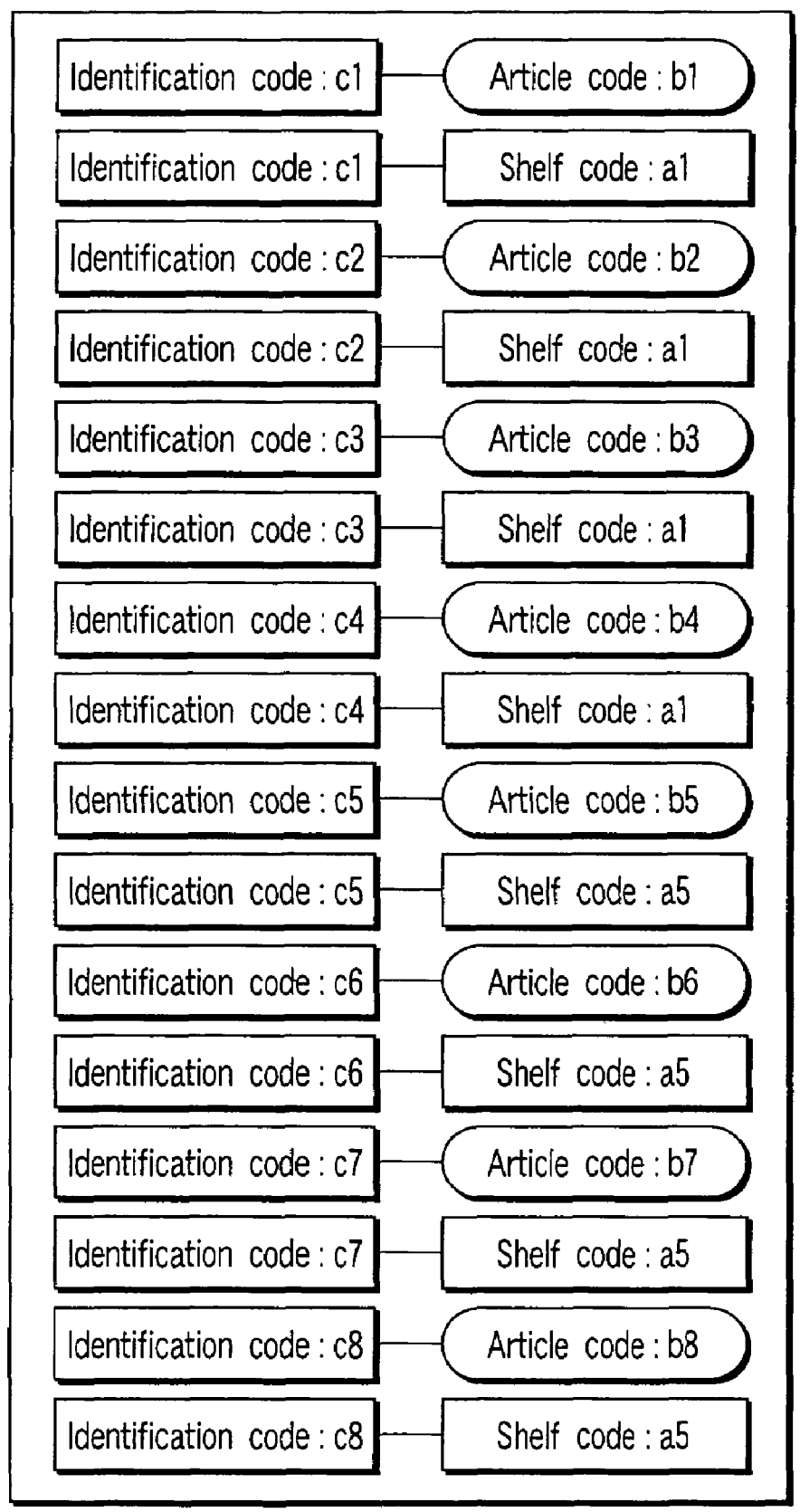
FIG. 12 is a diagram showing a record data example in which identification codes are used to make sets of the article and shelf codes created by the tag reading apparatus in the third embodiment.

Furthermore, as shown in FIG. 12, a common identification code may be used, and the article code and the shelf code may be managed so that they are matched via this common identification code. That is, a common identification code c1 is matched to the article code b1 and the shelf code a1, a common identification code c2 is matched to the article code b2 and the shelf code a1, a common identification code c3 is matched to the article code b3 and the shelf code a1, and a common identification code c4 is matched to the article code b4 and a shelf code a9. Further, a common identification code c5 is matched to the article code b5 and the shelf code a5, a common identification code c6 is matched to the article code b6 and the shelf code a5, a common identification code c7 is matched to the article code b7 and the shelf code a5, and a common identification code c8 is matched to the article code b8 and a shelf code a5.

It is to be noted that the management of the article and shelf codes has been described above in the third embodiment in connection with the case where a plurality of articles are displayed in one shelf area. On the contrary, it is also possible to display a plurality of articles of the same kind in a plurality of shelf areas.

In this case, a plurality of shelf codes are matched to the same article code, but for management, the article code can be combined one to one with the shelf code to create one set of record data, as in FIG. 10. Moreover, it is also possible to combine one article code with a plurality of shelf codes to create one set of record data. Further, as in FIG. 12, a common identification code can be used, and the article code and the shelf code can be managed so that they are matched via this common identification code.

Fourth Embodiment

Next, a fourth embodiment will be described.

As shown in FIG. 13, a tag reading apparatus 1 has a first wireless tag reader 111 as a first reader for reading an article code from an article tag TB-1 in a non-contact wireless manner, and a second wireless tag reader 121 as a second reader for reading a shelf code from a shelf tag TA-1. The fourth embodiment is the same as the first embodiment in other respects, which will not be described.

The first wireless tag reader 111 and the second wireless tag reader 121 are set to have output frequencies different from each other. That is, the first wireless tag reader 111 communicates with the article tag TB-1 using a frequency band of 2.54 MHz, while. the second wireless tag reader 121 communicates with the shelf tag TA-1 using a frequency band of 950 MHz.

Therefore, the article tag TB-1 is configured by an antenna-shaped wireless tag which can respond at a band of 2.54 MHz, and the shelf tag TA-1 configured by an antenna-shaped wireless tag which can respond at a band of 950 MHz. The configurations of other parts are the same as those in the first embodiment described above.

In the tag reading apparatus 1 having such a configuration, the frequency at which the first wireless tag reader 111 wirelessly communicates with the article tag TB-1 is different from the frequency at which the second wireless tag reader 121 wirelessly communicates with the shelf tag TA-1, so that the communication radio waves do not interfere with each other. This ensures that the first wireless tag reader 111 can read the article code from the article tag TB-1, and also ensures that the second wireless tag reader 121 can read the shelf code from the shelf tag TA-1.

It is to be noted that functions and effects similar to those in the first embodiment described above can also be obtained in other respects in this embodiment.

It is to be noted that the frequency at which the first wireless tag reader 111 wirelessly communicates with the article tag TB-1 is different from the frequency at which the second wireless tag reader 121 wirelessly communicates with the shelf tag TA-1 in this embodiment, but this is not a limitation. For example, the same communication frequency may be used on two sides, and the intensities of output on the two sides may be different instead.

For example, lower output is used when the first wireless tag reader 111 reads the article code from the article tag TB-1, while higher output is used when the second wireless tag reader 121 reads the shelf code from the shelf tag TA-1.

In this manner, each of the RFID tag reader 111 and 121 can selectively read the article tag TB-1 or the shelf tag TA-1 in accordance with the output. This ensures that the first wireless tag reader 111 can read the article code from the article tag TB-1, and also ensures that the second wireless tag reader 121 can read the shelf code from the shelf tag TA-1.

Fifth Embodiment

Next, a fifth embodiment will be described.

Figure 14:
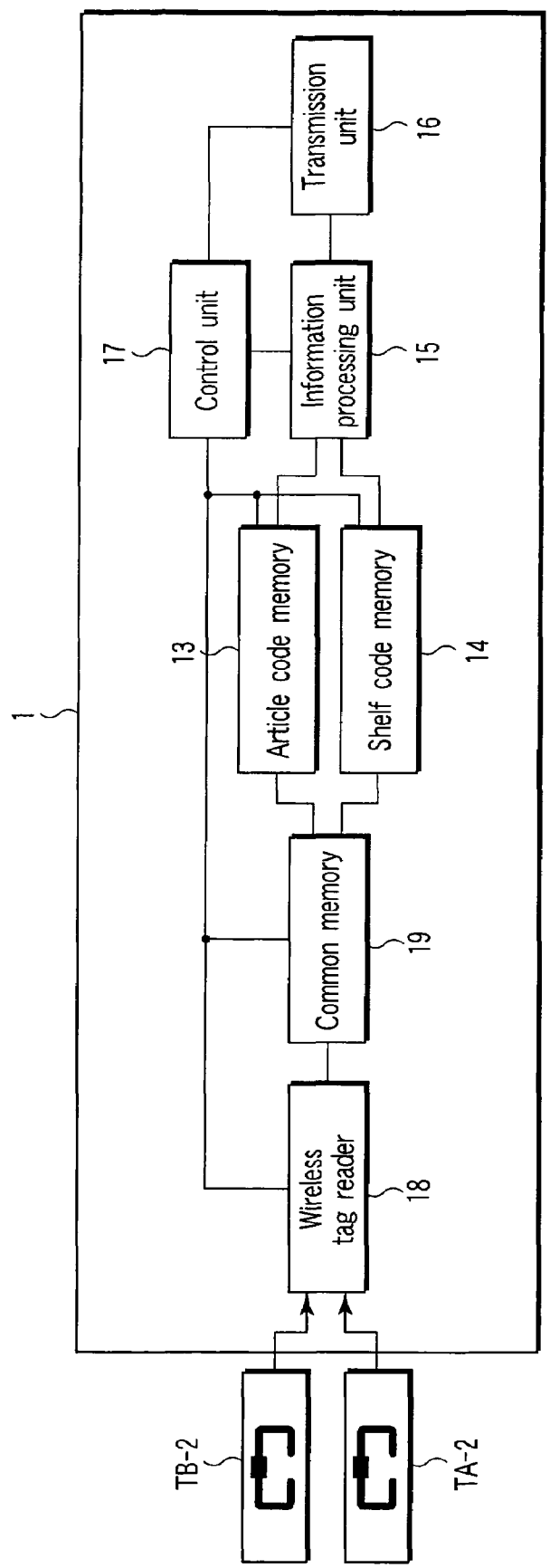
FIG. 14 is a block diagram of a tag reading apparatus according to a fifth embodiment of the present invention.

As shown in FIG. 14, an article tag TB-2 is used as an article tag in which an identifier Buppin and an article code are recorded as information in an RFID tag. Further, a shelf tag TA-2 is used as a shelf tag in which an identifier Tana and a shelf code are recorded as information in an RFID tag.

A tag reading apparatus 1 has a control unit 17 which is a controller for controlling the entire apparatus. The tag reading apparatus 1 has one wireless tag reader 18 which is a common reader for reading information from the article tag TB-2 and information from the shelf tag TA-2. There are provided a common memory 19 for temporarily storing the information from the article tag TB-2 and the information from the shelf tag TA-2 that are read by the RFID tag reader 18, an article code memory 13 for storing information when the information stored in the common memory 19 is the identifier of an article, and a shelf code memory 14 for storing information when the information stored in the common memory 19 is the identifier of a shelf. In addition, the common memory 19 connects the control unit 17, the RFID tag reader 18, the article code memory 13 and the shelf code memory 14. The configurations of other parts are the same as those in the first embodiment and are not described.

In the fifth embodiment, an operator of the RFID tag reader does not particularly need to be conscious of which of the shelf tag TA-2 and the article tag TB-2 to be read first. That is, whether the operator causes the shelf tag TA-2 to be read first and the article tag TB-2 to be read next or the operator causes the article tag TB-2 to be read first and the shelf tag TA-2 to be read next, the shelf code and the article code can be correctly processed as one set of data.

Figure 15:
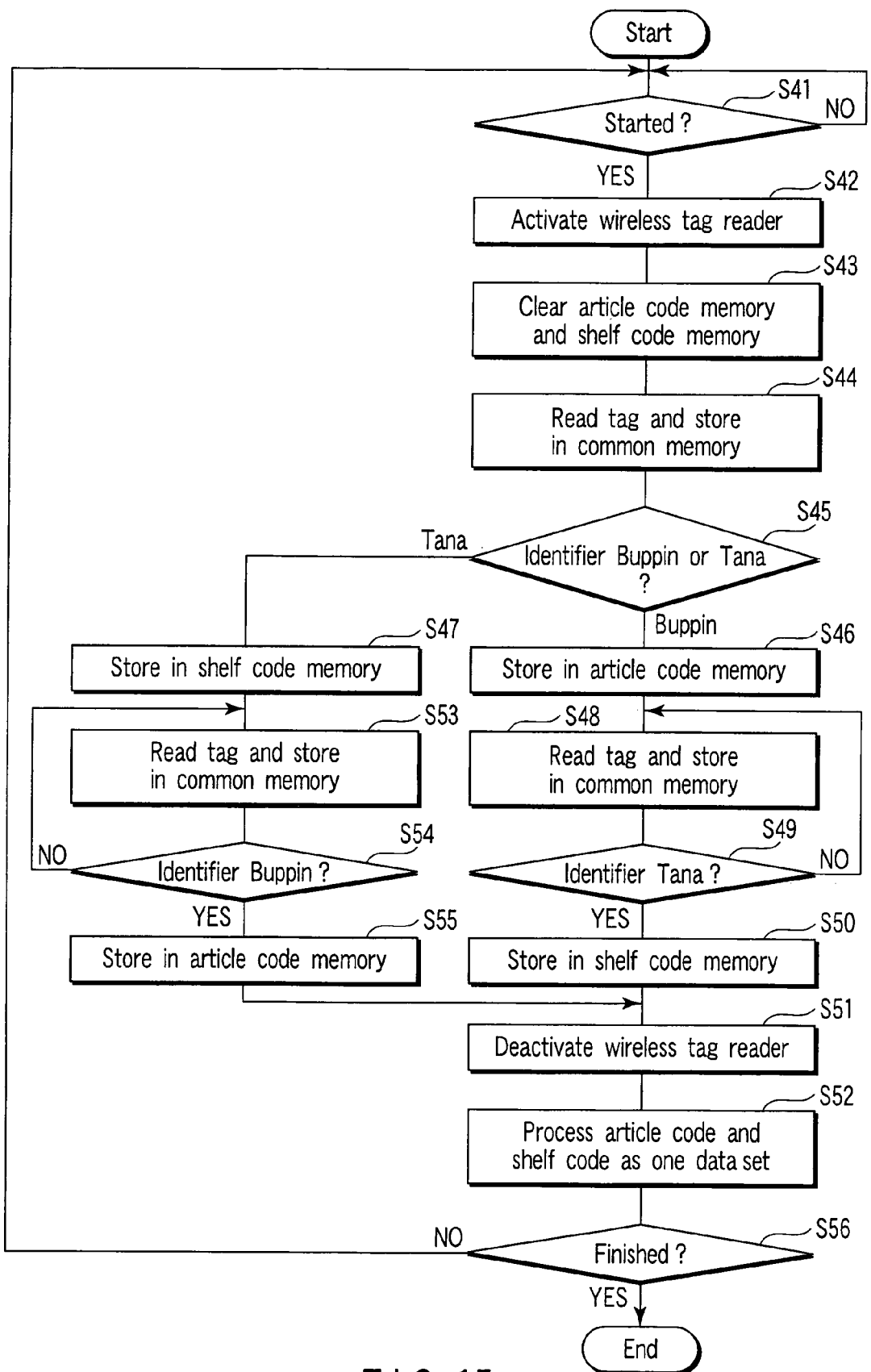
FIG. 15 is a flowchart showing tag reading control performed by a control unit of the tag reading apparatus in the fifth embodiment.

In this embodiment, the control unit 17 of the tag reading apparatus 1 performs tag reading processing compliant with a flowchart shown in FIG. 15.

In step S41, the control unit 17 of the tag reading apparatus 1 judges whether or not a switch (not shown) has been turned on. When judging that the switch has been turned on, the control unit 17 activates the RFID tag reader 18 in step S42. In step S43, the control unit 17 clears the article code memory 13 and the shelf code memory 14.

In step S44, the control unit 17 of the tag reading apparatus 1 stores the read information in the common memory 19.

Then, in step S45, the control unit 17 judges whether the identifier contained in the information stored in the common memory 19 is Buppin or Tana. When the identifier is judged to be Buppin, the article code is taken from the common memory 19 and then stored in the article code memory 13, in step S46. Then, the information on the article stored in the common memory 19 is cleared.

In step S48, the control unit 17 then stores, in the common memory 19, the information on the tag read by the RFID tag reader 18. In step S49, the control unit 17 judges whether the identifier contained in the information stored in the common memory 19 is Tana. If the identifier is not Tana, the control unit 17 judges that the article tag has been read twice in a row, and clears the information stored in the common memory 19, and then returns to step S48.

Furthermore, in step S49, if the identifier contained in the information stored in the common memory 19 is Tana, the shelf code is taken from the common memory 19 and then stored in the shelf code memory 14, in step S50.

Moreover, when both the article code and the shelf code have been read, the operation of the RFID tag reader 18 is deactivated in step S51. Then, in step S52, an information processing unit 15 is controlled by the control unit 17 to create one set of data out of the article code and the shelf code.

On the other hand, in step S45, if the identifier contained in the information stored in the common memory 19 is judged to be Tana, the shelf code is taken from the common memory 19 and then stored in the shelf code memory 14, in step S47. Then, the information on the article stored in the common memory 19 is cleared. In step S53, the control unit 17 then stores, in the common memory 19, the information on the tag read by the RFID tag reader 18. In step S54, it is judged whether or not the identifier contained in the information stored in the common memory 19 is Buppin. If the identifier is not Buppin, the control unit 17 judges that the shelf tag has been read twice in a row, and clears the information stored in the common memory 19, and then returns to step S53.

Furthermore, in step S54, if the identifier contained in the information stored in the common memory 19 is Buppin, the article code is taken from the common memory 19 and then stored in the article code memory 13, in step S55. This is followed by the processing in step S51.

Finally, in step S56, it is judged whether there is an instruction to terminate the reading operation in accordance with the operation of a switch (not shown) by the operator. When judging that there is the termination instruction, the control unit 17 terminates this tag reading processing. When judging in step S56 that there is no termination instruction, the control unit 17 returns to the processing in step S41.

In this manner, even if one wireless tag reader 18 is used, the use of the identifiers enables the tag reading apparatus 1 to recognize whether the read tag is the shelf tag or the article tag even when there is no arrangement for the order of reading the shelf tag and the article tag. This ensures that the article code can be read from the article tag, and also ensures that the shelf code can be read from the shelf tag. Moreover, one wireless tag reader can be used, so that the configuration can be simplified.

Next data is stored in the common memory 19 after the data therein has been cleared in the processing of the fifth embodiment described above, but the data may be overwritten.

It is to be noted that functions and effects similar to those in the first embodiment described above can be obtained in other respects.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A reading apparatus comprising:
   a reader which reads information from an article tag recording an identifier of the article tag and article information associated with an article, and a position tag recording an identifier of the position tag and position information associated with a position;
   a common memory which stores the information read by the reader;
   an article information memory which stores the article information recorded in the article tag;
   a position information memory which stores the position information recorded in the position tag;
   a controller which is configured to store the article information of the information stored in the common memory in the article information memory when the identifier of the information stored in the common memory is the identifier of the article tag, and store the position information of the information stored in the common memory in the position information memory when the identifier of the information stored in the common memory is the identifier of the position tag, and associates the article information stored in the article information memory with the position information stored in the position information memory to process the article information and the position information as one related set of information.

2. The reading apparatus according to claim 1, wherein the controller clears the information in the common memory when the identifier of the information stored in the common memory is the identifier of the article tag after the article information of the information stored in the common memory is stored in the article information memory, judging from the fact that the identifier of the information stored in the common memory is the identifier of the article tag.

3. The reading apparatus according to claim 1, wherein the controller clears the information in the common memory when the identifier of the information stored in the common memory is the identifier of the position tag after the position information of the information stored in the common memory is stored in the position information memory, judging from the fact that the identifier of the information stored in the common memory is the identifier of the position tag.

4. The reading apparatus according to claim 1, wherein the controller stops an operation of the reader when the article information is stored in the article information memory and the position information is stored in the position information memory.

* * * * *